Feb. 5, 1935.   P. W. JONES   1,990,187
POWER AUGMENTER
Filed May 7, 1934   3 Sheets-Sheet 1
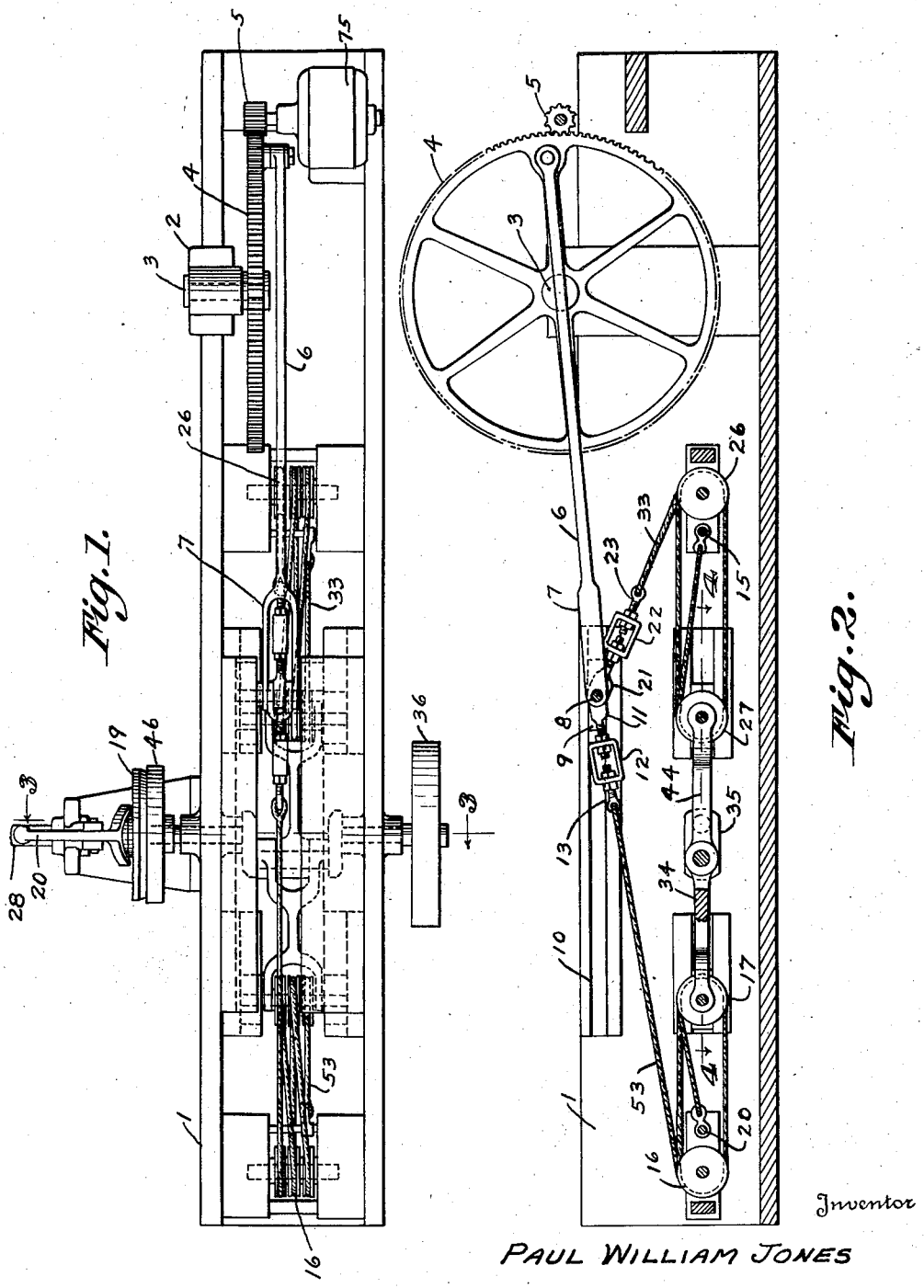
Inventor
PAUL WILLIAM JONES
By Howard J. Whelan.
Attorney Feb. 5, 1935. P. W. JONES 1,990,187
POWER AUGMENTER
Filed May 7, 1934  3 Sheets-Sheet 2
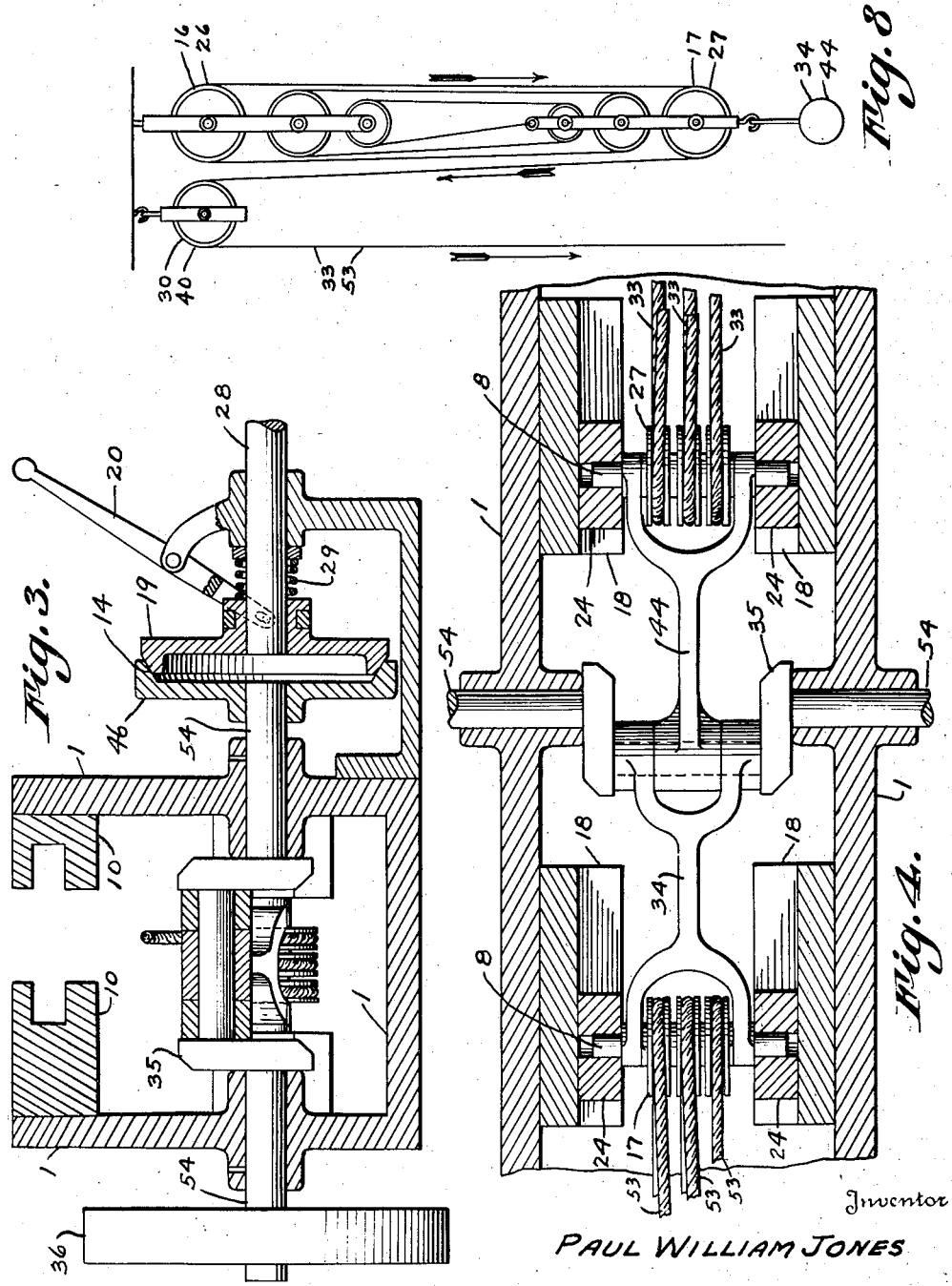
Inventor
PAUL WILLIAM JONES
By Howard J. Whelan.
Attorney

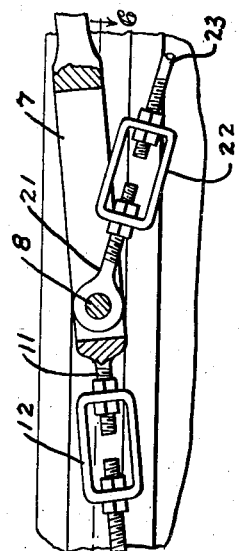
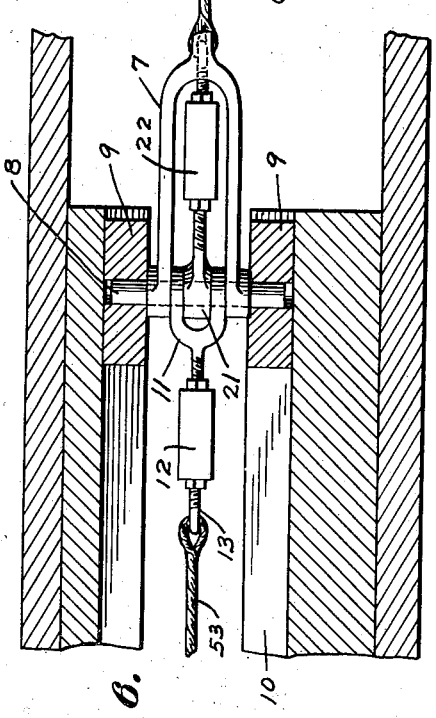
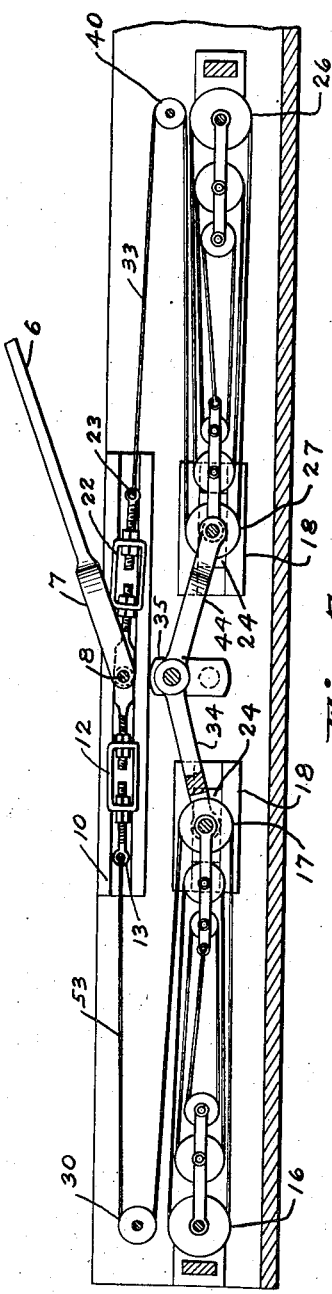

Patented Feb. 5, 1935

1,990,187

UNITED STATES PATENT OFFICE 1,990,187

POWER AUGMENTER

Paul William Jones, Baltimore, Md.

Application May 7, 1934, Serial No. 724,442

9 Claims. (Cl. 74—63)

This invention refers to the application of machine elements and more particularly to a mechanism for augmenting the operative effect of a source of power used for propelling the mechanism. It has among its objects to provide an arrangement of mechanism in a machine of this type that will be of simple construction, flexibility, and capable of adjustment; while the possibilities for control of the degree of power transfer without gears, levers and the like can be great. Other objects will become apparent as the invention is more fully set forth.

In the methods used for speed reduction and increase of power used in the present art in practical performance, gears, levers and similar rigid connections are utilized for the purpose, and are relatively expensive. In this invention, the reduction of speed and increase of power is derived from the use of pulleys and flexible medium of transmission, such as rope or chain. The medium of transmission is capable of adjustment, and also affords a flexibility which will meet the stresses of use without strain on the other parts of the mechanism.

In the drawings which illustrate a modification of this invention:—

Figure 1 is a plan view of an embodiment of this power augmenter embodying this invention, Figure 2 is an elevation of Figure 1 with parts broken away to make the operative mechanism of the augmenter clear, Figure 3 is a sectional detail taken transversely through Figure 1 on the line 3—3, Figure 4 is an enlarged detail in plan taken along the line 4—4 of Figure 2, Figure 5 is an enlarged detail of the connecting-rod slider and adjustment connections.

Figure 6 is a plan view in section taken along the line 6—6 of Figure 5,

Figure 7 is a modified form of the invention using a different alignment of the pulleys, Figure 8 is a diagrammatic view of the pulley mechanism used in Figure 7.

Similar reference characters refer to similar parts throughout the drawings.

In the construction shown, 1 represents the general frame parts for a power augmenter, and supports a bearing member 2 for holding the shaft 3 of a driver gear 4. This gear 4 is driven by a pinion gear 5 that is mounted on a motor 75 or other source of power.

A connecting rod 6 is attached to the large gear 4 in a conventional manner, while its driving end portion 7 is preferably bifurcated and loosely mounted on a pin 8, which in turn rests in two slider blocks 9 as indicated in Figure 6. The slider blocks reciprocate on channels or guides 10 which are mounted on the frame 1. A link 11 also bifurcated, is mounted on the same shaft 8 loosely as also is the link 21. The links 11 and 21 are provided with adjusting members 12 and 22 respectively, 13 and 23 which serve as attachments for the operating ropes 53 and 33 respectively.

The rope 53 passes over a sheave of stationary pulleys 16 which are situated at end of the machine, called the forward end for convenience in referring thereto. While a movable sheave 17 running on guides 18 in two slider blocks 24, in a reciprocating manner is operated by the rope similarly to the operation of a block pulley principle. The sheave 17 is linked with a connecting arm 34 to the pin of a crank 35 which rotates on its shaft 54. This last mentioned shaft is journaled in the frame 1 and has a main fly-wheel 36 and auxiliary fly-wheel 46 mounted on it. The rope 53 terminates in a stationary eyelet 20, so that the movement of the gear wheel 4 will cause the rope to operate the arm 34 and crank 35, the details of which will be fully described.

The rope 33 also passes over a stationary sheave of pulleys 26 and operates a movable sheave 27 running on guides 18 in two slider blocks 24, as indicated. The sheave 26 is provided with a connecting arm 44 which also is attached to the crank pin of the crank 35. The end of the rope is secured to a stationary eyelet 15.

The operation of the mechanism is as follows: The gear 4 rotates and pulls on its connecting rod 6 causing the ropes 53 and 33 to move to the right or left as the case may be. While one rope is pulled the other is relieved, which permits the sheaves 17 and 27 to move in the same direction at all times. This in turn makes their respective connecting arms 34 and 44 turn the crank. As the sheaves are provided with a plurality of pulleys the pull on the ropes exerted through the gear wheel 4 is greatly augmented at the crank. The amount being determined definitely by the arrangement of the pulleys by methods which are well known in mechanics and will not be explained herein.

The crank shaft fly-wheel 46 is provided with a facing 14 which can be engaged by a clutch 19 which is operated by a lever 20, shaft 28 and spring 29 in a conventional manner. This arrangement permits the power of the machine being transferred to other devices requiring the modified power. As the ropes operate the mechanism, they take up the varied eccentricities of the reciprocating movement and rotative operation of the source of power in a resilient manner and thus make a more uniform effective power drive on the crank, and in case of an excessive strain or stress will provide for use and absorb the stress while later using the potential effort causing such in a different part of the travel. The system is simple and inexpensive, and offers a great arrangement of applicability to various reductions of speeds and augment of power. The wear is readily taken up in the adjustment members or turnbuckles and afford any take up that may be desirable to suit any particular work, instead of being rigidly restrained as in the case of gears and levers in general.

The modified form shown in Figures 7 and 8 use an additional pulley 30 and 40 respectively and the ropes end on the movable sheaves, but the general principles of operation follow as in the former instance and construction, the use of this modification being adaptable for any special purpose where that form might be preferable.

While the forms indicated in the drawings, show two main forms of this invention, it is not desired to limit this application to those particular forms or in any way other than limited by the prior art, as it is appreciated that other forms might be used that would employ the same principles and come within the scope of the appended claims.

I claim:

1. A power augmenter having a frame, a motor device mounted thereon, and a wheel operated thereby, a connecting rod on the wheel and adapted to reciprocate at its free end, a slider connected to the free end of the connecting rod, links mounted on the slider, ropes connected with the slider and operated thereby, sheaves of pulleys operated by the ropes, means operated by the sheaves, a crank operated by said means and means for transferring power from the last mentioned means, all mounted on the frame.

2. A power augmenter comprising in combination a power wheel, means reciprocated by the said wheel, a plurality of ropes operated by the said means, pulley elements operated by the said ropes, crank means operated by the pulley elements and means for transferring the power from the operating crank means, and a frame for supporting all of said parts.

3. A power augmenter comprising a power-wheel means having a connecting rod, a slider operated by the connecting rod, link means operated by the slider, a flexible medium means attached to the said link means, a plurality of means operated by the flexible medium and arranged to augment the pulling power of the slider, and a frame for supporting the said parts.

4. A power augmenter comprising a frame, a rotating member a connecting rod attached to and operated by the said member, a slider block reciprocated by the said connecting rod, links attached to the said slider block, ropes attached to the links, and pulled and relieved thereby as the links reciprocate, sheaves of pulley blocks, portion of same being stationary and portion movable and intertwined with said ropes on a block and falls system, connecting arms operated by the operation of the movable sheaves, a crank mechanism rotated by said connecting arms, and means connected with said crank mechanism for delivering power thereto for extraneous use, and power means for operating the rotating member, and means for supporting the above mentioned parts on the said frame.

5. A power augmenter comprising a framework, a rotating member mounted on said framework, a slider mechanism, means for operating the slider mechanism from said member, ropes attached to said slider mechanism, sheaves of pulleys and blocks winding through with said ropes, arms operated by the operation of said sheaves, a crank operated by the said arms, flywheels connected with said crank, a clutch mechanism for operation through the said crank and by contact with one of its flywheels, and means for attaching the said parts on the frame-work, and a source of power for operating the rotating member.

6. A power augmenter comprising a rotating member, a connecting rod attached to said member, a slider attached to said rod and reciprocated thereby, guides for the slider, links attached to the slider, rope means attached to the links, a plurality of pulleys with said rope means wound thereon, a movable mechanism operated by said pulleys, guides for said pulleys to control the movement thereof, and means operated by said movable mechanism for transmitted power from the rotating member, pulleys, slider and connecting rod and rope means.

7. A power augmenter comprising a frame, a slider on the frame and reciprocatable thereon, a rope means attached to the slider, a stationary sheave of pulleys mounted at one end of the frame, a moveable sheave of pulleys mounted on another portion of the frame, said sheaves of pulleys being interconnected with said rope means whereby the pull on the moveable sheave will be augmented a predetermined degree, a crank attached to said moveable sheave and actuated thereby, a flywheel for energizing the said crank, means for taking off power from said crank mounted on the frame, and a source of power from actuating said slider.

8. A power augmenter comprising a frame for supporting the parts of the augmenter, a rope medium, a slider moveable on the frame, a plurality of stationary sheaves mounted on the frame, a plurality of moveable sheaves also mounted on the frame and spaced away from the stationary sheaves, said sheaves having pulleys for guiding the rope medium therethrough and controlling the degree of augmentation of the power transmitted through the augmenter, a crank mechanism on the frame, a plurality of attachments for connecting the crank and moveable sheaves in operable connection, means for accumulating energy and giving the crank a more uniform motion, guide means for the moveable sheaves to guide them in predetermined directions and in cooperation with each other and mounted on the frame, and means for actuating the slider, and clutch means for flexibly transferring power from the crank mechanism.

9. A mechanism of the class described comprising a driving wheel, a connecting rod driven by said wheel, a slider reciprocated by said rod, a set of guides for said slider, a frame for supporting the wheel and guides, flexible power transmitting means attached to the slider and tensionally operating the same, a plurality of block and falls mechanism operated by the said means, a cross head, guides, and connecting rod arms on said frame operated thereby, a crank member operated by the arms from divers directions, flywheels for the crank and a clutch mechanism connected with one of the flywheels for transmitting power from the first mentioned mechanism and motive means for operating the driving wheel.

PAUL WILLIAM JONES.